Sept. 22, 1931.     H. FRANKFORT ET AL     1,823,891
ADJUSTABLE VALVE LOCK
Filed Oct. 22, 1928
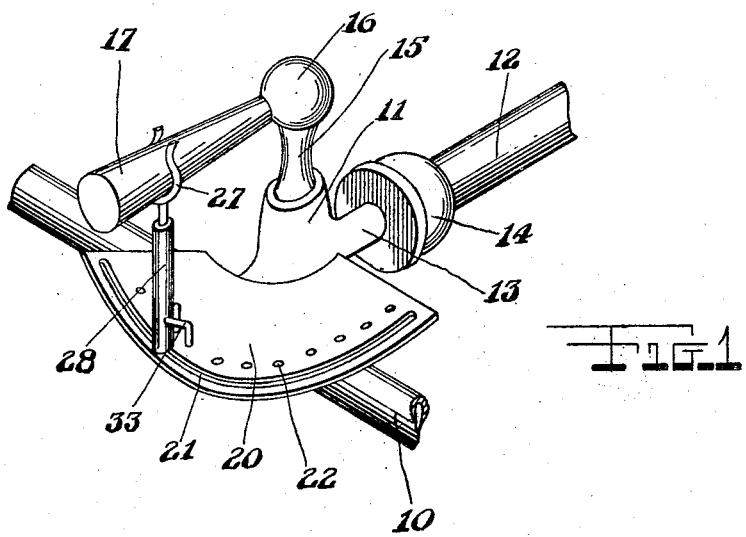
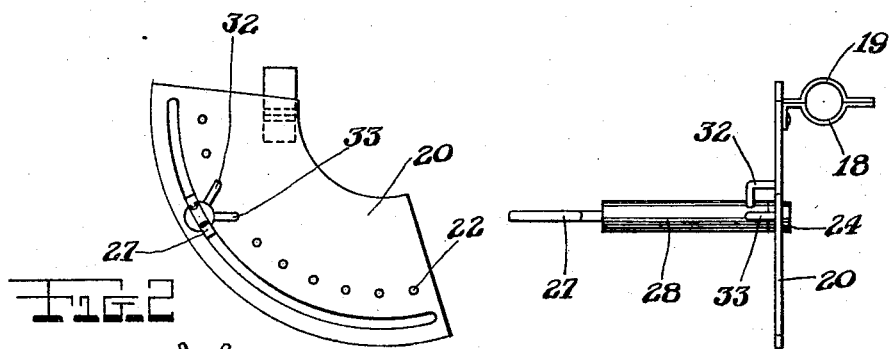
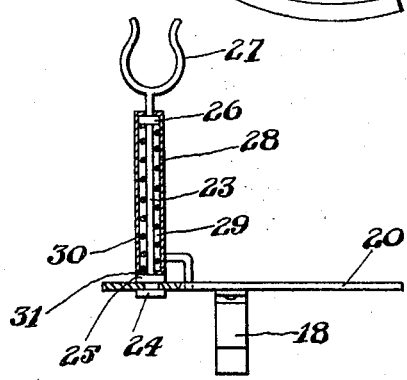
Inventors
H. Frankfort
A. Frankfort
By his Attorney
J. Ledermann Patented Sept. 22, 1931

1,823,891

UNITED STATES PATENT OFFICE

HARRY FRANKFORT AND ALICE FRANKFORT, OF BROOKLYN, NEW YORK

ADJUSTABLE VALVE LOCK

Application filed October 22, 1928. Serial No. 314,050.

The main object of this invention is to provide an attachment for gas valves having a handle which moves the valve shank, and the purpose of the device is to enable the user to automatically latch the valve handle in the closed, completely open, or intermediate positions so that any amount of gas flow may be had.

Another object of this invention is to provide an attachment for gas valves which is secured to the valve body and has a movable member thereon, coupled to the handle of the valve shank, which may be latched by the user in various positions.

The above and other objects will become apparent in the description below, in which characters of reference refer to like-named parts in the drawings.

Referring briefly to the drawings, Figure 1 is a perspective view of the valve attachment, showing it as applied to a valve.

Figure 2 is a top plan view of the valve attachment per se.

Figure 3 is an end elevational view of the device.

Figure 4 is a longitudinal, partly sectioned, front elevational view of the device, showing the means of depressing the latching valve.

Referring in detail to the drawings, the numeral 10 indicates the fuel supply pipe which is connected to the main at one end. These fuel supply pipes are applied, and form a unit with, gas ranges and similar other gas burning devices. To the fuel supply pipe a series of valves, such as those indicated by the numeral 11, are tapped. These valves are arranged in series and are spaced-apart from each other. These valve bodies are commonly provided with a tapering shank in which a port is located, said port, when in open position, permitting communication with the gas fuel supply pipe and the burner sleeve 12. The one nipple of the valve body is, as previously mentioned, tapped to the gas supply pipe 10, while the other nipple 13, diametrically opposite, is inserted into the capped end 14 of the burner supply sleeve 12. The shank of the valve, whose upper end 15 is exposed, is rotatably mounted in the valve. This upper end of the shank is surmounted by a spherical member 16 from which a handle bar 17 extends at right-angles to the shank and is adapted to be rotated in a horizontal plane.

Attached to the nipple which taps into the fuel supply pipe 10 is a split clamp consisting of a semi-circular strap 18 and an independent semi-circular strap 19, which latter is secured to the former by screws or similar other devices, and is complemental to member 18. The clamp member 18 is secured to a segmental flat plate 20 positioned above the gas fuel supply pipe 10. Said plate is provided with a curved slot 21, concentric about the axis of the shank 15, and is over ninety degrees of arc in length so that the member traveling in the slot is capable of following the handle bar 17 from the closed to the open position. Adjacent the slot 21 a plurality of equally spaced-apart openings 22 are provided and are also generated about the axis of the shank 15. The slot 21, formed in the plate, has movable therein the lower end of a stud 23. This lower end of said member is flanged with members 24 and 25 on both sides of the plate 20 so that said stud 23 cannot be displaced from the device. Near the upper end of the stud 23 a collar 26 is located and, surmounting this collar, is a fork 27, which latter is adapted to receive the handle bar 17 of the valve.

A hollow barrel envelopes the major portion of the shank and, when in lowered position, the upper closed end of the shank is adapted to come to rest upon the collar 26. The lower end of the barrel is provided with a closed face, and, when the barrel is in lowered position, seats upon the flange 25. The bore 29 of said barrel has a coil spring 30 therein. This coil spring is wound about the stud 23, seats upon the lower face 31 of the barrel, and, at its upper end, contacts with the collar 26. A pair of L-shaped latch prongs project from the side of the barrel 28 and are adapted to be urged into any pair of openings 22 by the tension of the spring 30 as these prongs pass any pair of openings in the plate 20.

The device is adapted to serve as a safety latching unit for positively securing the valve shank in either the open, the closed or any of a number of intermediate positions. The plate is secured in its desired location by removing the independent clamp member 19 and seating member 18 rigid with the plate 20 over one of the nipples of the valve body 11. The strap 19 is then again secured in place on the opposite side of the nipple, but, before this is done, the plate is so positioned beneath the valve handle 17 that it may accommodate the reception of the valve handle 17 within the fork 27. The bore 29 of the barrel, and the collar 26 mounted therein, are square in outline so that the barrel may not be rotated upon the stud 23. After the plate has been secured in place the device is ready for use. By pulling the barrel upwardly the latching prongs 32 and 33 are retracted out of any pair of openings 22 after which the handle bar 17 of the valve is free to be rotated. By releasing the barrel the latch pegs are permitted to slide upon the surface of the plate and these latch pegs, when arriving at the next opening, will immediately plunge into these openings and again latch the handle bar in a new position. In this manner the handle bar may be latched in completely open position, completely closed position, or in any intermediate position, and forms an additional safeguard against an unauthorized manipulation of the valve handle 17 by children or others not intelligent enough to understand the device or the dangers of meddling therewith.

It is to be noted that certain changes in form and construction may be made without departing from the spirit and scope of the invention.

We claim:

1. In a device of the class described, a valve body having a swingable handle bar thereon, a plate having a curved slot and openings formed therein, said openings and curved slot being generated about the axis of said valve body, a stud mounted movably on said plate guided in a circular path in said slot and being connected to said handle bar, a barrel slidable on said stud, latch pegs depending from said barrel adapted to register in said openings, and resilient means in said barrel for causing said first-named means to drop into said openings.

2. In a device of the class described, a valve body having a swingable handle bar thereon, a plate having a curved slot and openings formed therein, said openings and curved slot being generated about the axis of said valve body, a stud secured rotatably and movably on said plate guided in a circular path in said slot and being connected to said handle bar, a barrel slidable on said stud, latch pegs depending from said barrel adapted to register in said openings, a collar on said stud in said barrel, said barrel having a lower closed end, and a coil spring in said barrel seating on said lower closed end thereof and contacting with said collar, said spring being adapted to urge said barrel downwardly to cause said latch pegs to drop into said openings.

In testimony whereof we affix our signatures.

HARRY FRANKFORT.
ALICE FRANKFORT.